United States Patent [19]

Roberts

[11] Patent Number: 4,865,359
[45] Date of Patent: Sep. 12, 1989

[54] PRESS FIT PIPE JOINT AND METHOD

[75] Inventor: Richard A. Roberts, Galveston, Tex.

[73] Assignee: Brown & Root, Inc., Houston, Tex.

[21] Appl. No.: 64,120

[22] Filed: Jun. 18, 1987

[51] Int. Cl.$^4$ ............................................. F16L 19/00
[52] U.S. Cl. ...................................... 285/94; 285/369; 285/382; 285/915; 29/525
[58] Field of Search ................. 285/382, 915, 906, 94, 285/369, 417; 403/300; 29/525

[56] References Cited

U.S. PATENT DOCUMENTS

| | | | |
|---|---|---|---|
| 547,400 | 10/1895 | Palmiter | 285/417 |
| 2,741,498 | 4/1956 | Elliot | 285/161 |
| 2,802,044 | 4/1957 | Corne | 29/525 X |
| 3,208,136 | 9/1965 | Joslin | 29/458 |
| 3,210,102 | 11/1965 | Joslin | 285/374 |
| 3,266,256 | 8/1966 | Postlewaite et al. | 61/72.3 |
| 3,343,252 | 9/1967 | Reesor | 29/458 |
| 3,389,563 | 6/1968 | Postleweaite et al. | 61/72.3 |
| 3,451,119 | 6/1969 | Coberly et al. | 29/525 X |
| 3,466,738 | 9/1969 | Mount | 29/525 |
| 3,472,034 | 10/1969 | Lawrence | 61/72.3 |
| 3,476,413 | 11/1969 | Coberly et al. | 285/332.3 |
| 3,477,750 | 11/1969 | Powell | 285/382 X |
| 3,585,806 | 6/1971 | Lawrence | 61/72.3 |
| 3,680,322 | 8/1972 | Nolan, Jr. et al. | 61/72.3 |
| 3,720,069 | 3/1973 | Lockridge | 61/72.3 |
| 3,827,727 | 8/1974 | Moebius | 285/27 |
| 3,860,122 | 1/1975 | Cernosek | 214/1 P |
| 3,909,045 | 9/1975 | Meagher | 285/22 |
| 4,064,619 | 12/1977 | Echols et al. | 29/458 |
| 4,068,490 | 1/1978 | Jegousse | 61/108 |
| 4,196,334 | 4/1980 | Thome | 219/61 |
| 4,257,155 | 3/1981 | Hunter | 29/511 |
| 4,274,665 | 6/1981 | Marsh | 285/382 X |
| 4,277,091 | 7/1981 | Hunter | 285/55 |
| 4,286,137 | 8/1981 | Thome | 219/121 |
| 4,295,526 | 10/1981 | Hauk et al. | 166/315 |
| 4,310,184 | 1/1982 | Campbell | 285/238 |
| 4,328,983 | 5/1982 | Gibson | 285/382 |
| 4,330,924 | 5/1982 | Kushner et al. | 29/458 |
| 4,389,763 | 6/1983 | Marsh, Jr. | 29/237 |
| 4,486,123 | 12/1984 | Koch et al. | 405/169 |

FOREIGN PATENT DOCUMENTS

| | | | |
|---|---|---|---|
| 706776 | 3/1965 | Canada | 285/43 |
| 74915 | 6/1977 | Japan | 285/382 |

Primary Examiner—Dave W. Arola
Attorney, Agent, or Firm—Lahive & Cockfield

[57] ABSTRACT

A pipeline of an indeterminate length, having a substantially constant inner diameter throughout its length, is formed by frictionally joining together a plurality of adjacent pipe segments. The ends of each pair of adjacent pipe segments are frictionally joined within an external, cylindrical sleeve member. The sleeve member has a substantially smooth inner bore and a substantially constant inner diameter, and is adapted to receive the adjacent pipe ends which abut within the sleeve.

The joint of the disclosed pipeline is so designed that its strength can develop at least the yield stress of the material from which the pipeline is constructed.

8 Claims, 5 Drawing Sheets

PRESS FIT PIPE JOINT AND METHOD

BACKGROUND OF THE INVENTION

1. Field of the Invention

This invention relates to a weldless method of joining pipe segments to form a pipeline of indeterminate length. More particularly, the invention relates to a friction fit pipe joint which leaves an interior bore of uniform diameter within the pipeline.

2. Description of the Prior Art

There exist a variety of methods of joining pipe segments to form a pipeline of indeterminate length. Common techniques for joining such pipe segments include various welding techniques, threaded joining techniques and interference fit techniques.

Welding techniques for forming pipelines to be used in subsea applications can be time-consuming and expensive. Additionally, the pipeline must be examined, usually by x-ray techniques, to confirm that it is satisfactory and suitable for use in subsea applications. Similarly, threaded pipe joining techniques have not found acceptance in sub-sea operations because they too are costly for the application.

A pipeline joining technique of recent popularity is that which utilizes friction or interference fitting. Common among such joining methods are the so-called "bell and pin" techniques and sleeve joining techniques.

In the "bell and pin" techniques the pipe ends are machined such that one end of a pipe is of an enlarged diameter, and formed into a bell shape, while the other end is tapered to a pin shape. Pipe segments are joined by interferingly fitting a pin end into a bell end. Although less expensive and less time-consuming than welding or threading methods, a disadvantage of these techniques is that the joint may be incapable of withstanding high pressure and may either leak or separate when the conduit is subjected to higher interior pressures. Such techniques are disclosed in U.S Pat. Nos. 4,064,619; 4,257,155; and 4,277,091.

In sleeve joining techniques the ends of pipe segments are interferingly joined within an external sleeve. Such techniques often involve tapering or contouring of either the interior bore of the sleeve or the pipe ends. Usually, the pipe joints formed by these techniques have protrusions which extend into the interior bore of the pipeline. U.S. Pat. Nos. 3,343,252; 3,476,413; 4,295,526; and 4,389,763 disclose such techniques.

Despite the above disclosures there remains a need for an effective technique of rapidly and economically fitting pipe segments, of sufficient strength for sub-sea applications, to form a pipeline having an interior pipeline bore which is smooth and free of protrusions and obstructions.

SUMMARY OF THE INVENTION

It is therefore an object of the present invention to provide a method and apparatus for frictionally fitting pipe segments to form a suitably strong pipeline of indeterminate length. It is a further object to provide a method and apparatus for forming, by frictional fit, a pipeline joint having a smooth inner diameter free of any obstructions which would hinder flow or the through-passage of tools. It is also an object of the present invention to provide a method for easily, economically and quickly frictionally joining pipe segments to form a pipeline. Finally, an object is to provide a frictionally fit pipe joint which is easily and quickly formed, and which is able to withstand the stresses encountered by offshore pipelines. Other objects will be apparent to those of ordinary skill in the art upon reading the following disclosure and claims.

The pipeline of the present invention is formed by a plurality of individual pipe segments. Adjacent pipe segments are joined end-to-end within a smooth, external coupling sleeve. Preferably a coating of epoxy, or a similar sealing compound is applied to one or both of the adjacent pipe ends before they are pressed into the coupling sleeve. The epoxy provides lubricity during the press-fitting operation, and also acts as a seal against corrosion at the pipe ends. Once a pipe joint is formed a bead of epoxy, or similar sealant, may be applied around the ends of the coupling sleeve to further protect against the possibility of corrosion.

Thus, a metal-to-metal seal is effected by the force fitting of pipe segments within a metal coupling sleeve. The pipe joint is so designed that it will meet or exceed the minimum yield strength (required by API codes) of the parent Pipe in tension and bending.

The pipeline joint disclosed herein, and the method of forming the same, is particularly applicable to use in offshore pipelines. The pipeline construction operation requires little on-site pre-assembly or pre-treatment of pipe segments. What little pre-assembly and pre-treating is required may be done on-shore, well before the pipeline is to be assembled. When offshore construction of the pipeline is to be effected, the pipe segments may be quickly joined aboard a floating vessel, such as a pipelaying barge located offshore. As several pipe joints are formed the pipeline becomes elongated and is disposed on the sea bed. Hence, the pipeline is simultaneously constructed and disposed beneath the surface of the body of water.

It has been found that the method of this invention provides increased joint reliability, and also allows offshore pipelaying construction to be accomplished by up to about four times faster than conventional welded joint construction techniques.

In a preferred embodiment, a pipeline assembly fixture is mounted on the rear of a pipelaying vessel which is disposed at an offshore location. This apparatus forcingly fits the pipe segments within a coupling sleeve which is pre-mounted to the trailing end of the pipe segments. Once the pipe joint is formed the pressing apparatus is reversed and applies a force equal to the minimum specified strength of the joint, in an attempt to pull the joint apart. This constitutes a testing procedure to ensure that the joint is indeed sufficiently strong to meet its specified minimum yield strength. Also, each joint is tested for leakage by internally or externally pressurizing the joint.

As two pipe segments are joined together and tested, that portion of the pipeline is advanced and a new pipe segment is positioned over the trailing end of the pipeline which has secured thereto a coupling sleeve. The new pipe segment is then forced within the pipe sleeve. This process is repeated until a pipeline of a desired length is constructed. As the pipeline length increases during the construction process, the pipeline is guided beneath the surface of the body of water and deposited on the sea bed.

The apparatus of this invention may be utilized in either of the "S lay" mode or the "J lay" mode of pipelaying. In the "S lay" mode of operation the pressing apparatus is operated in a substantially horizontal orientation on the deck of the vessel. In this mode, the pipeline describes an S-like figure from the vessel to the sea bed. The apparatus is particularly useful in the "J lay" mode where the pressing apparatus is disposed at an inclined orientation. In this mode the pipeline describes a J-like figure from the vessel to the sea bed. In either mode, conventional welding, x-ray and other workstations may be eliminated from aboard the construction vessel.

DETAILED DESCRIPTION OF THE PREFERRED EMBODIMENTS

Figure 1:
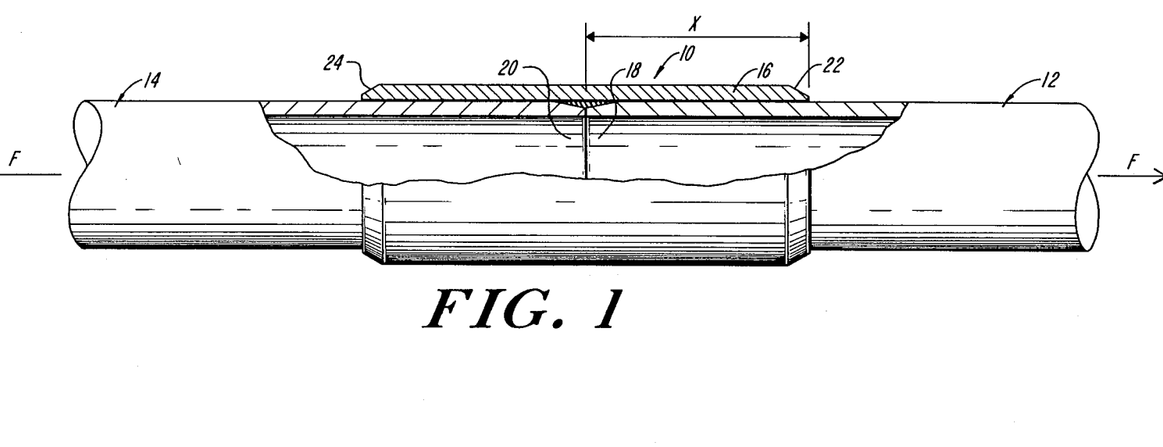
FIG. 1 is a schematic view, partially cut away, of a pipe joint formed according to the present invention.

Referring to FIG. 1 a pipe coupling joint 10 is shown connecting two segments of pipe 12, 14. The coupling joint 10 includes a cylindrical coupling sleeve 16 and pipe ends 18, 20 securely engaged within coupling sleeve 16.

Coupling sleeve 16 is a cylindrical member having an outer shell and a substantially smooth inner surface which defines an interior bore having a substantially constant inner diameter. Sleeve 16 may be constructed of any type of material approved for use in offshore pipelines by the API. Stainless steel is a material particularly well-suited for use with this invention. Sleeve 16 also features end portions 22, 24 which are machined so as to have a slightly tapered outer shell.

Figure 1A:
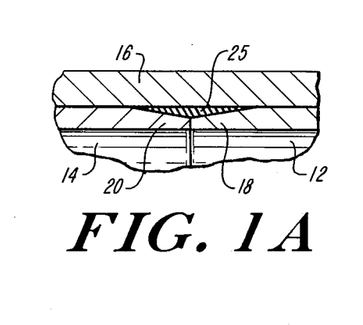
FIG. 1A is a detail, side sectional view of the pipe joint of FIG. 1.
Figure 1B:
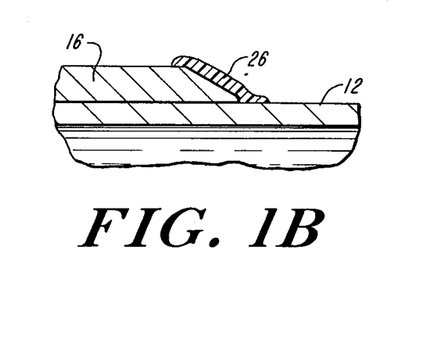
FIG. 1B is a detail, side sectional view of the sleeve end of FIG. 1.

Referring to FIGS. 1, 1A and 1B, adjacent pipe ends 18, 20 of pipe segments 12 and 14, respectively, are enveloped by sleeve 16 such that Pipe ends 18 and 20 abut each other as shown best in FIGS. 1 and 1A. The outer surfaces of the pipe ends 18, 20 are securely engaged by a frictional fit with the inner surface of sleeve 16. As a result, the formed joint features a smooth inner bore and a constant inner diameter, since as shown in FIG. 1A, pipe ends 18 and 20 abut each other within sleeve 16 and are flush with each other throughout the circumferences of the respective pipe segments. The smooth inner bore of this pipe coupling joint is desirable because it enables tools to be passed through the pipeline with relative ease and without any possibility of becoming caught on or obstructed by protrusions formed by the coupling.

Preferably, pipe outer surfaces near and on ends 18, 20 are coated with an epoxy resin 25, or similar material, to provide some lubricity during the fitting of the pipe segments within the coupling 16. The epoxy, or other lubricating material, also contributes to the formation of a gas-tight seal, and the prevention of crevice corrosion, between the abutting ends of pipe segments 18 and 20. In the event that any epoxy enters the inside diameter of the pipe as a result of the joining operation, it may easily be removed from within the pipeline with the use of an internal wiping tool as is well known in the art.

In a preferred embodiment, once the coupling joint has been formed an epoxy seal 26 is applied to the tapered end portions 22 and 24 of sleeve 16, as shown in FIG. 1B, to prevent corrosion, and to some extent to act as an additional seal.

It is particularly important that offshore pipelines be of sufficient strength to withstand the unique set of forces to which they are exposed during construction, laying and operation. For example, during pipelaying applications, the pipeline is typically subjected to very high tensile and bending forces which could cause the pipeline joints to fail unless they are of sufficient strength. The pipe joint of the present invention is designed such that the strength of the joint will develop at least the specified minimum yield stress of the pipe material. Preferably, however, the joint will develop a pipe stress which slightly exceeds the minimum yield stress of the pipe material.

To aid in the formation of a suitably strong joint, the ends of the pipe segments and the coupling sleeve may be subjected to well known cold working processes prior to assembly of the joint. During cold working these components may be stretched to the plastic region of the material to increase the yield strength of the pipe segment ends or the sleeve, or both. This makes it possible to achieve a higher yield strength at the joint than at other locations along the pipeline and to control the internal diameter of the pipe segment end to whatever tolerance is required.

It is understood that this invention is applicable to the wide variety of pipe materials used in offshore applications, as well as to pipe segments and coupling sleeves of different dimensions which are typically used in offshore applications. Thus, it is not possible to set forth any single preferred dimension of inside sleeve diameter relative to outside pipe diameter, or a preferred length of overlap of coupling sleeve on each pipe segment end.

However, an example of the relative joint dimensions for a smaller scale ASTM A513 Grade 1015 steel pipeline is as follows:

| | |
|---|---|
| Sleeve Length | 4.40" |
| Length of Overlap | 2.20" |
| Pipe O.D. (before Joining) | 1.500" |
| Pipe I.D. | 1.370" |
| Sleeve O.D. (before joining) | 1.630" |
| Sleeve I.D. (before joining) | 1.461" |
| Diametrical Interference | 0.039" |

As noted above, a variety of materials may be used to form the pipe segments and sleeve useful with the present invention. Virtually the only requirement for such materials is that they possess stress-strain characteristics compatible with the disclosed joining process.

Figures 2A, 2B, 3:
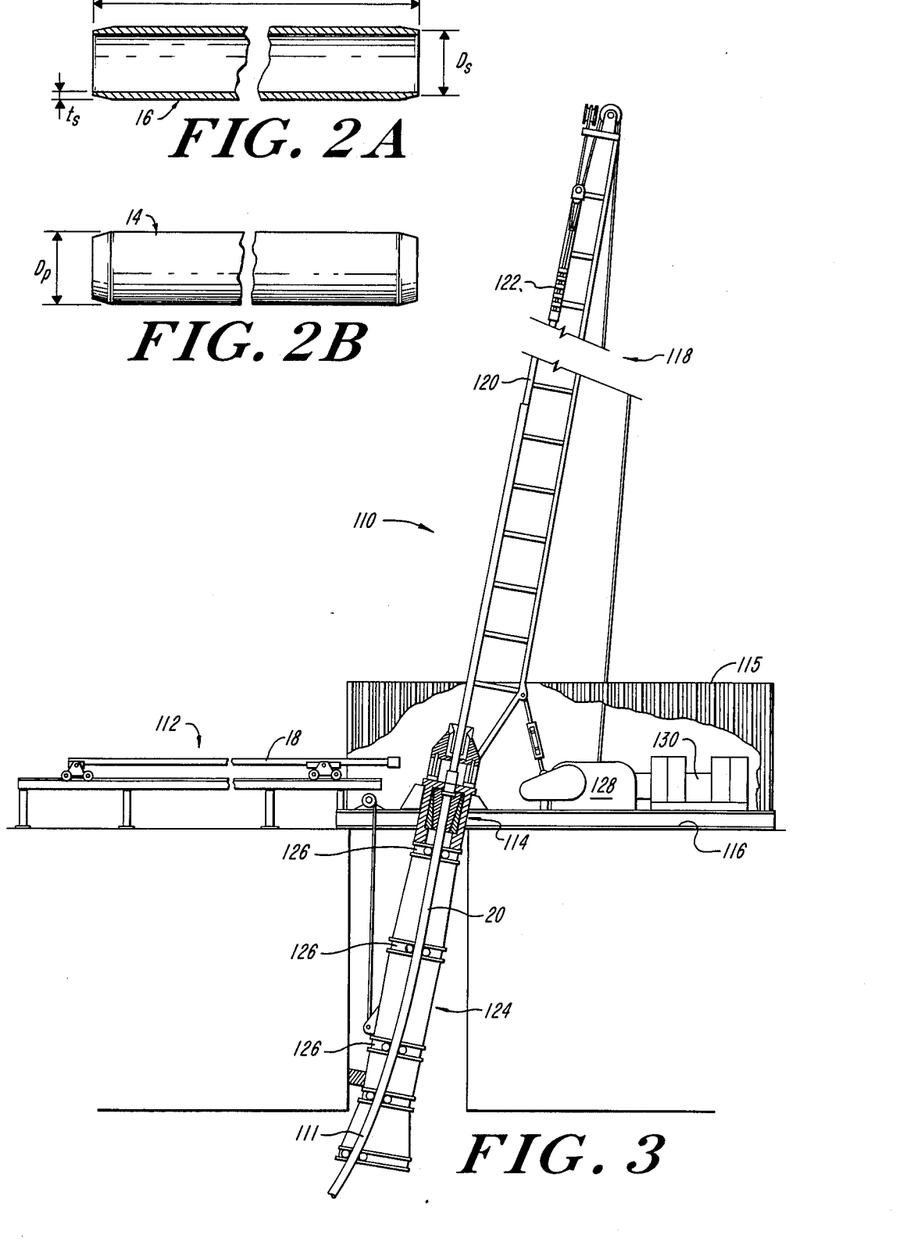
FIG. 2A is a schematic representation of a coupling sleeve used to form the joint of FIG. 1.
FIG. 2B is a schematic representation of the end of a pipe segment used to form the joint of FIG. 1.
FIG. 3 is a partial schematic view of the pipelaying construction vessel of the present invention, showing a preferred pipe construction apparatus in a J-lay mode.

Generally, given the desired pipe material to be used in constructing the pipeline, the relative dimensions of the pipe segments and coupling sleeve may be determined as follows. First the dimensions of the pipe segments, such as segment length, outside diameter and wall thickness, are selected. These dimensions depend on the application requirements of a particular pipeline and are easily determined by those of ordinary skill in the art. Examples of factors which will contribute to these dimensions include forces to which the pipeline will be subjected during construction, pipelaying and operation. FIGS. 1, 2A and 2B illustrate the pipe joint and the geometry of various elements which comprise the joint.

The tensile force ($F_y$) on the pipe associated with yield stress in the pipe ($S_y$) may be determined by the following equation:

$$F_y = (\pi D_p t) S_y \qquad (1)$$

where $F_y$ = tensile force on the pipe at material yield stress
$D_p$ = mean diameter of pipe;
$t$ = wall thickness of pipe; and
$S_y$ = specified minimum yield stress of material. The values for $D_p$, $t$ and $S_y$, to meet the requirements of a particular application, will all be known as they will be pre-selected.

Next, the distance by which the coupling sleeve overlaps each end of a pipe segment is determined. Theoretically, the minimum required length of sleeve overlap ($x$) occurs when the hoop stress in the pipe equals the yield stress of the pipe material. The hoop stress can be determined as $$\text{hoop stress} = pD_p/2t = S_y \qquad (2)$$

where $p$ = external or internal pressure being exerted on the pipe.

The actual required length of overlap ($x$) can be determined as:

$$x = K_e(D_p/2\mu) \qquad (3)$$

where $\mu$ = coefficient of static friction between the pipe segment and sleeve;
$K_e$ = empirical constant to accommodate end effects; and
$x$ = required length of overlap.

During press fitting, the pipe end will exhibit a slight decrease in diameter due to the compressive force exerted by forcing it into the coupling sleeve. This change in diameter ($\Delta D_p$) is determined by the equation:

$$\Delta D_p = I - (S_s D_s/E) \qquad (4)$$

where $I$ = Diametrical interference between the pipe and sleeve;
$S_s$ = Hoop stress in the sleeve;
$D_s$ = Mean diameter of sleeve;
$E$ = Young's Modulus of Elasticity; and
$\Delta D_p$ = Change in pipe diameter resulting from press fit.

The corresponding increase in sleeve diameter is determined by modifying equation (4) to account for corresponding dimensional variable of the sleeve.

Once the desired minimum stress level for the sleeve material has been determined (e.g., equal to the minimum yield stress level of the material), the equation for hoop stress, equation (2), may be used to solve for the diameter of the sleeve ($D_s$) and sleeve wall thickness ($t_s$).

It is understood that other engineering procedures and computer modeling techniques may be used by those skilled in the art to determine the dimensions of joint components. The above equations and explanation is therefore provided only by way of example.

FIG. 3 illustrates a preferred apparatus 110 for effecting the pipe joining method of the present invention. The apparatus 110 is preferably used for simultaneously constructing and laying a pipeline 111. In this embodiment, apparatus 110 is secured to a floating vessel (not shown) such as a pipe laying barge. A pipe feed conveyor 112 may be mounted toward the aft section of the vessel. The pipe feed conveyor 112 supplies pipe segments 18 to a press fitting machine 114 for joining to the pipeline 111. Preferably, a supply of additional pipe segments (not shown) is disposed adjacent the pipe feed conveyor 112. Apparatus 110 may be substantially vertically oriented, as shown in FIG. 3, to facilitate what is known in the art as a "J-lay" pipelaying technique. In the J-lay mode a press fitting machine 114 is mounted on the vessel deck 116 at approximately the midsection of the vessel. The machine 114 is orientated at a slight angle near vertical for greater ease in laying the pipeline. Mast 118 is disposed above machine 114 and is angularly aligned with machine 114. Mast 118 includes a guide track 120 and an internal pipe slip 122 which cooperate to guide new pipe segments to machine 114 for joining to the pipeline 111. Disposed below machine 114, and angularly aligned with machine 114, is a moonpool stinger 124 which extends through an aperture in the deck 116 of the vessel and below the surface of the water. Moonpool stinger 124 provides subsea support for the pipeline, and guides the pipeline toward its destination in or on the seabed. Stinger 124 includes a series of pipe guides 126 which direct the pipeline in the desired direction beneath the water's surface.

Apparatus 110 also includes a winch 128 and a winch drive 130 for guiding new pipe segments to press fit machine 114, and for aiding in other pipelaying operations. In one embodiment the press fitting machine 114, the pipe lay-down winch 128 and the winch drive 130 may be located within an environmental enclosure 115.

Figure 4A:
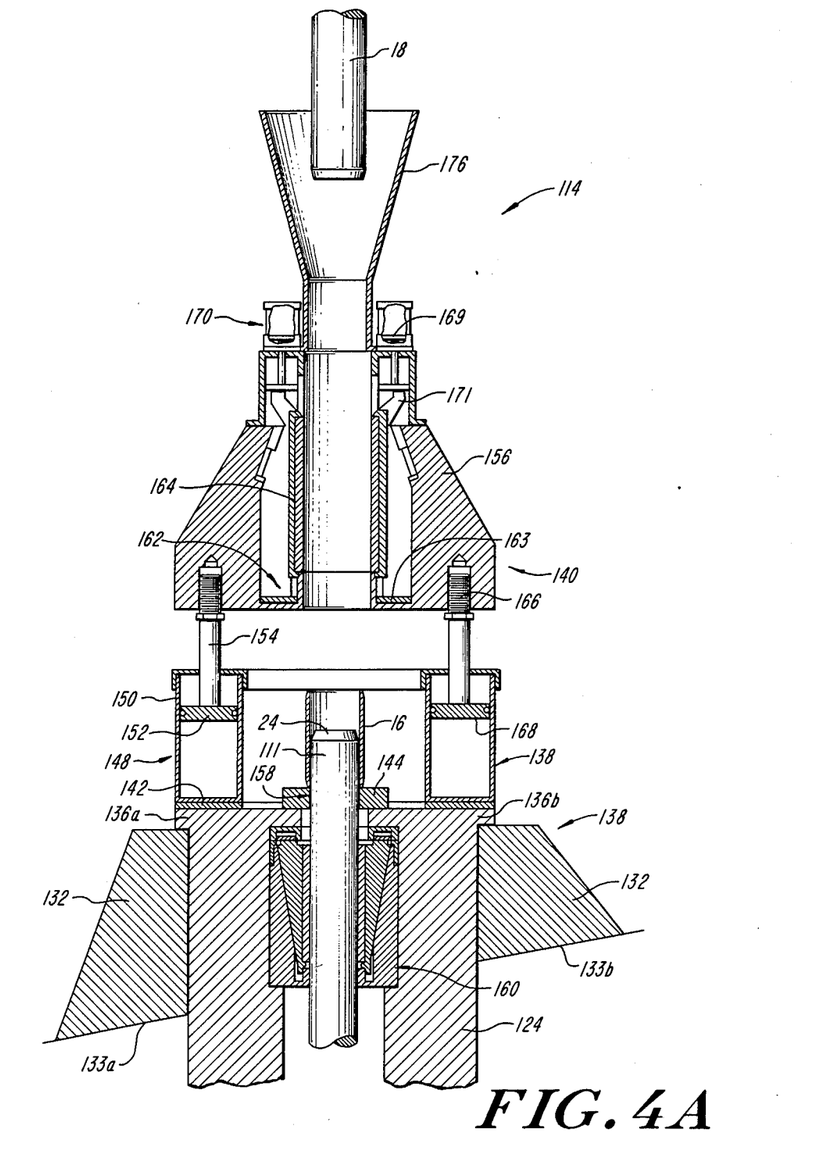
FIG. 4A is sectional view of the preferred pipe joining apparatus as a new pipe section enters the pipe construction apparatus.
Figure 4B:
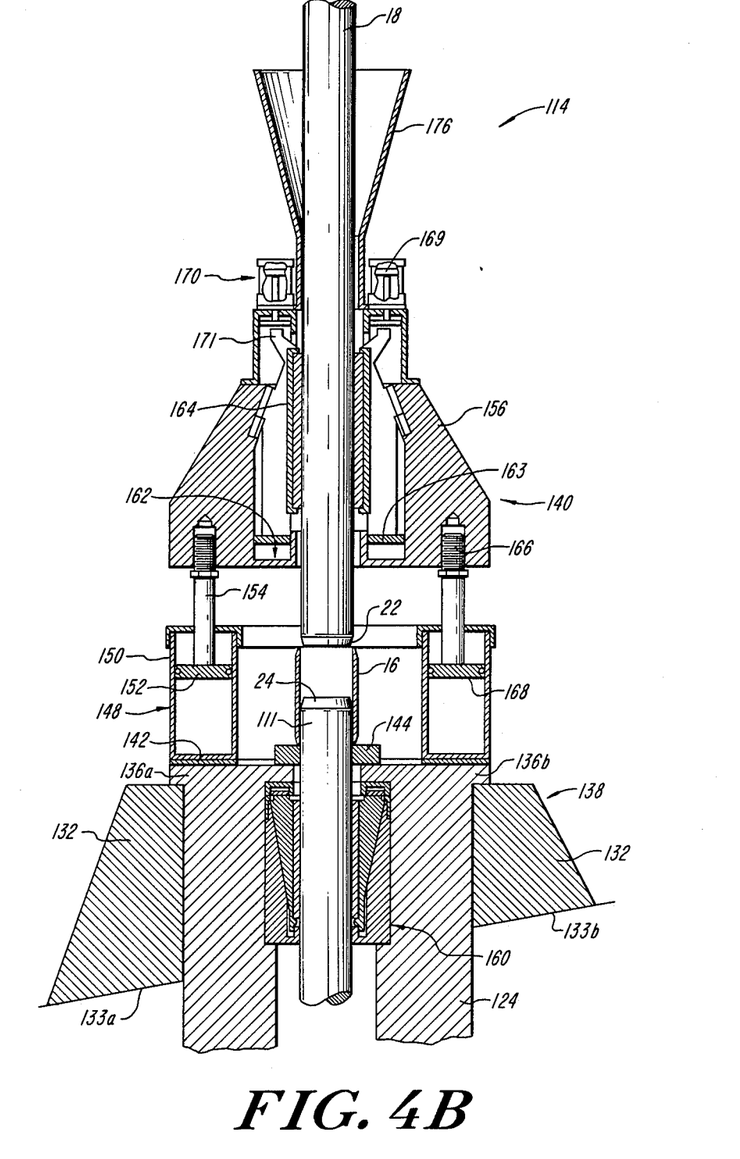
FIG. 4B is a sectional view of the preferred pipe joining apparatus showing engagement of the new pipe segment prior to pressing.
Figure 4C:
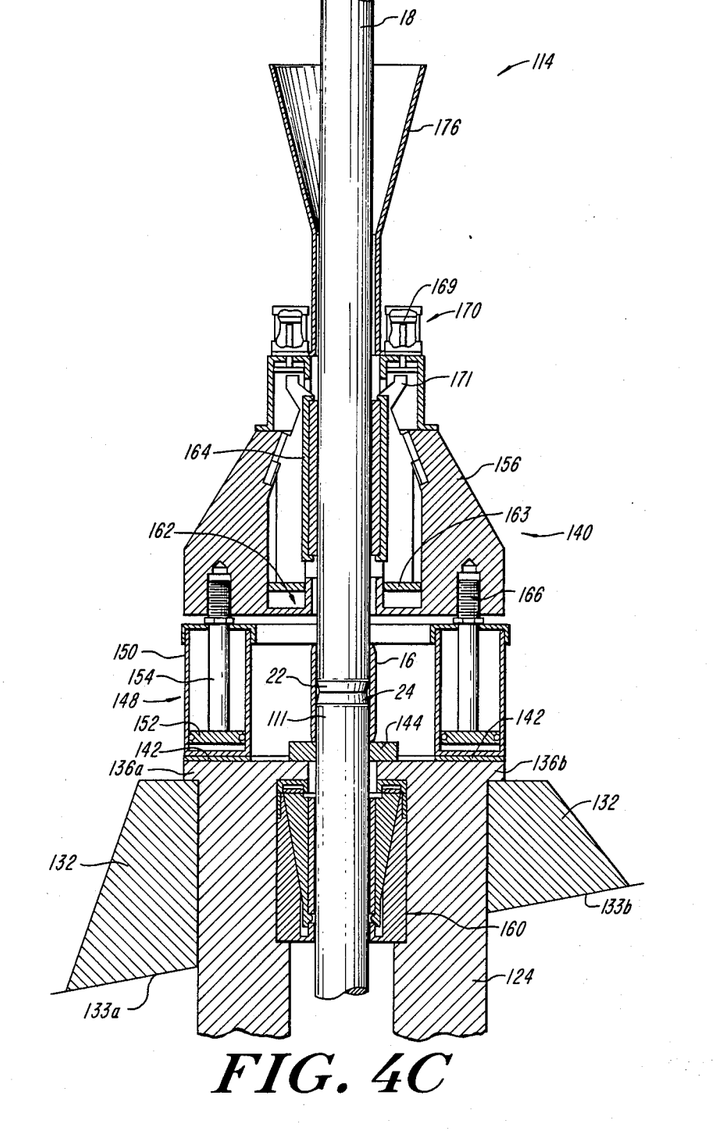
FIG. 4C is a sectional view of the preferred pipe joining apparatus showing the completed press fit of the new pipe segment.

Referring to FIGS. 4A, 4B and 4C, pressing machine 114 is mounted upon a moonpool stinger 124 which protrudes from the deck of the vessel (not shown) and extends downwardly beneath the surface of the body of water in which the pipeline is to be laid. Stinger 124 is, in turn, surrounded and secured by an annularly-shaped support 132. Support 132 surrounds stinger 124, while shoulders 136a and 136b of the stinger 124 abut the top surface of support 132. The bottom surfaces 133a and 133b of support 132 are inclined at a slight angle, equal to that which machine 114 is to be operably disposed during pipe joining and laying operations.

Pressing machine 114 may be described as having two sections: a lower, stationary section 138, and an upper, movable section 140. The base 142 of the lower portion of machine 114 abuts moonpool stinger 124. Lower portion 138 features a centrally disposed annular base plate 144 having a central aperture 158 for receiving the pipeline 111. Pressing cylinders 148 are disposed at the outer perimeter of the lower portion 138 of machine 114. Preferably, pressing machine 114 includes four pressing cylinders 148, but it is possible to use more or less depending upon the requirements of a particular application. Each pressing cylinder 148 includes a housing 150 enclosing a piston 152 having a piston rod 154 protruding from the top surface thereof. The distal end 166 of each piston rod is embedded in and secured within a housing 156 of the upper portion 140 of machine 114.

Lower portion 138 also includes a central aperture 158, which base plate 144 surrounds, and which extends from a pipe feed hopper 176 down through the center of moonpool stinger 124. Aperture 158 is adapted to receive pipeline 111 as it is being constructed. Lower pressing slips 160 are disposed about aperture 158 at a location below base plate 144. Pressing slips 160 act as clamps which selectively engage pipeline 111 to firmly secure it during the pressing operation.

The upper portion 140 of pressing machine 114 includes a housing 156 which surrounds locking cylinder 162 and upper pressing slips 164.

Housing 156 provides a solid structure which is able to anchor the distal ends 166 of piston rods 154. Ends 166 are threadingly secured within housing 156, such that the application of force to a lower surface 168 of piston 152 will raise upper portion 140, and consequently, a reduction of the force will enable upper portion 140 to be lowered to substantially abut lower portion 138.

Unlocking cylinders 170 are disposed on a top portion of housing 156, surrounding central aperture 158. Central aperture 158 is adapted to receive pipe segments 18 which are to be joined to the pipeline 111. Pipe segments 18 are guided into aperture 158 through hopper 176.

The press fitting joint forming operation is best described with reference to FIGS. 4A, 4B and 4C. Referring to FIG. 4A, the upper portion 140 of the pressing apparatus is separated from the lower Portion 138 as a result of the activation of the pressing cylinder 148 by applying a hydraulically generated force to the underside of piston 152, thereby raising piston 152 and piston rods 154. Also, lower press slips 160 are activated so as to securely engage the trailing end of the pipeline 111 to which a coupling sleeve 16 has been pre-attached. Unlock cylinders 170 are in the actuated position in FIG. 4A as a force is applied to the top surface of unlock piston 169 causing the piston to act on the upper shoulders 171 of the upper pressing slips 164, thereby forcing the pressing slips outwardly to enlarge the diameter of aperture 158 and enable it to easily receive a new pipe segment. With upper press slips 164 outwardly disposed, the new pipe segment 18 is inserted into the guide hopper 176 and the leading end of the new pipe segment 18 abuts the trailing end of the coupling sleeve 16 which is pre-attached to the trailing end of each pipe segment.

As shown in FIG. 4B, once the new pipe segment 18 is positioned in aperture 158 and aligned with sleeve 16, upper press slips 164 are then closed by removing the force from the topside of piston 169, and by applying a force to the underside of upper press slip piston 163. This causes upper press slips 164 to clampingly engage the new pipe segment.

With reference to FIG. 4C, the press fitting operation is effected by removing pressure from the underside of the piston 152, and applying a force to the top side of piston 152, thereby causing the top portion 140 of the pressing machine 114 to again come into contact with the lower portion 138 of the pressing machine 114. This pressing action causes the forward end of the new pipe segment 18 to be forcingly fit within the sleeve 16.

Eventually, the forward end 22 of new pipe segment 18 is pulled into contact with the trailing end 24 of the last pipe segment of the constructed pipeline as shown in FIG. 4C. The coupling thus formed is that described above.

The forces necessary to actuate the upper and lower pressing slips as well as the unlock cylinder and the press cylinder may be supplied by a hydraulic control system, the design of which may be easily accomplished by one having ordinary skill in the art. It is also possible that one skilled in the art may devise other control systems without departing from the spirit or scope of this invention.

During the pressing operation, the force used to press fit the pipe segment within the sleeve should not be so great as to exceed the yield stresses in the sleeve. Otherwise, it will not be possible to disassemble the joint, while keeping the joint sleeve in useable condition for a new pipe segment.

The coupling joint thus formed may be tested simply by reversing the pressing operation and applying a tensile force corresponding to the minimum specified yield stress desired of the pipe material. If the joint does not fail upon the application of this force, it will possess sufficient strength for its desired application.

An additional testing procedure is conducted after the joint is formed, but before it is operably disposed, to ensure that the joint is leak-free. This is effected by pressurizing the joint to be tested. If leaks exist the joint may be disassembled by applying a sufficiently strong tensile force. The joint may then be re-fitted with a new pipe segment.

The length of the pipeline is extended by advancing the newly added segment and repeating the process described above for each new pipe segment which is to be added to the pipeline.

The above method and apparatus has been described with reference to the construction of sub-sea pipelines. However, it is understood that the invention described herein may be particularly advantageous in other construction applications as well. Examples of such additional applications include the construction of land-based pipelines, marine structures, land based structures and the like.

It is understood that the method for forming the pipeline joint of this invention has been described with reference to a currently preferred embodiment and that other methods and pressing apparatuses may be devised for forming substantially the same joint without departing from the spirit or scope of this invention. Also, while the pressing apparatus has been described with respect to a "J-lay" mode of operation slight modifications may easily be effected by one of ordinary skill in the art to effect a "S-lay" mode of operation.

What is claimed is:

1. A coupling joint connecting adjacent pipe segments to from a pipeline of indeterminate length, comprising:

a cylindrical sleeve member having first and second ends and outer shell which defines a substantially smooth interior bore extending throughout the length of the sleeve, said sleeve having throughout its length a substantially uniform inner diameter equal to a first distance;

a first cylindrical pipe segment having first and second ends and an outer shell which defines a substantially smooth interior bore, said pipe having a substantially smooth uniform outer diameter equal to a second distance;

a second cylindrical pipe segment having first and second ends and an outer shell which defines a substantially smooth interior bore, said pipe having a substantially smooth uniform diameter equal to a second distance;

said first and second pipe segments being disposed within said interior bore of said sleeve such that the first end of said pipe segment and the second end of said second pipe segment abut, said pipe segments being securely held within said sleeve in frictional engagement such that the diametrical interference (I) between the pipe segments and the sleeve member equals $$\Delta D_p + (S_s D_s/E)$$

where, $\Delta D_p$ = change in pipe diameter resulting from press fit;

$S_s$ = hoop stress in the sleeve;

$D_s$ = means diameter of the sleeve; and $E$ = Young's modulus of Elasticity.

2. Apparatus of claim 1 having a sealing compound disposed between said pipe ends which abut within said sleeve.

3. Apparatus of claim 2 wherein said sealing compound is disposed about the diameter circumferences of said first and second ends of said sleeve.

4. Apparatus of claim 3 wherein said sealing compound is an epoxy cement.

5. Apparatus of claim 4 wherein said sealing compound acts as a lubricant during the joining of said first and second pipe segments within said sleeve.

6. Apparatus of claim 1 wherein the strength of said coupling joint can develop at least the yield stress of the material of which said pipeline is constructed.

7. Apparatus of claim 1 wherein the strength of said coupling joint can develop a pipe stress greater than the yield stress of the material of which said pipeline is constructed.

8. Apparatus of claim 1 wherein said pipeline is adapted for subsea use.

* * * * *